United States Patent [19]

Guida et al.

[11] Patent Number: 4,735,669

[45] Date of Patent: Apr. 5, 1988

[54] ROLLING OF METALLIC FOIL AND PLASTICS RESIN FILM LAMINATES

[75] Inventors: James H. Guida, Chesterfield County; Thomas E. Kirk, Henrico County, both of Va.

[73] Assignee: Reynolds Metals Company, Richmond, Va.

[21] Appl. No.: 901,989

[22] Filed: Sep. 2, 1986

Related U.S. Application Data

[63] Continuation of Ser. No. 753,883, Jul. 11, 1985, abandoned.

[51] Int. Cl.⁴ ............................................. B29C 65/44
[52] U.S. Cl. ................................... 156/229; 29/445; 29/458; 29/527.7; 156/244.22; 156/244.27; 156/306.6; 156/324; 156/331.7; 156/334; 264/171; 264/280; 264/288.4
[58] Field of Search ................ 264/171, 280, 288.4; 156/244.27, 306.9, 324, 306.3, 306.6, 229, 244.22, 331.7, 334; 29/445, 458, DIG. 1-2, 527.7

[56] References Cited

U.S. PATENT DOCUMENTS

| | | | |
|---|---|---|---|
| 229,676 | 7/1880 | Crooke | 229/87 R |
| 1,225,044 | 5/1917 | Lauber et al. | 29/18 |
| 1,340,149 | 5/1920 | Browne | 428/606 |
| 1,621,502 | 3/1927 | Freund et al. | 29/17 R |
| 1,845,155 | 2/1932 | Jordan | 228/117 |
| 2,121,559 | 6/1938 | Demel | 29/18 |
| 2,334,230 | 11/1943 | Swift | 29/17 |
| 3,505,159 | 4/1970 | Winter | 156/324 |
| 3,589,975 | 6/1971 | Andrews et al. | 161/165 |
| 3,647,617 | 3/1972 | Rieke et al. | 156/324 |
| 3,773,585 | 11/1973 | Butcher | 156/324 |
| 4,407,689 | 10/1983 | Ohtsuki | 156/243 |

OTHER PUBLICATIONS

Rolling Aluminum Foil–An Experimental Study on A Modern Mill, Yokote, Y. and Nomura, S., 83 Journal of the Institute of Metals 241, 1959.

Nipca Technology for Aluminum Foil Rolling, Shutler, Michael V. and Guettinger, Heinz, date unknown.

Modern Plastics Encyclopedia, Oct. 1981, vol. 58, No. 10A, p. 432.

Primary Examiner—Jeffery Thurlow
Attorney, Agent, or Firm—Alan T. McDonald

[57] ABSTRACT

A method is disclosed for forming laminates of plastics resin films and metallic foils. The plastics resin film is adhesively bonded to the metallic foil. The bonded laminate is then rolled under pressure to thin both the plastics resin film and metallic foil layers. In addition to reducing the thickness of the laminate, the rolling operation increases the length of the laminate and orients the plastics resin film in the machine direction.

17 Claims, 1 Drawing Sheet

ROLLING OF METALLIC FOIL AND PLASTICS
RESIN FILM LAMINATES

This application is a continuation of application Ser. No. 753,883 filed July 11, 1985, abandoned.

BACKGROUND OF THE INVENTION

Laminates of plastics resin films, such as polyethylene, polypropylene, polyvinyl chloride, nylon and the like, and metallic foils, such as aluminum, lead, steel and the like, are employed for numerous purposes, including labels, packaging materials, and the like. In such laminates, the materials cooperate to provide properties as a unit which the individual components fail to provide as single layer materials. Thus, the metallic foil, especially aluminum foil, provides oxygen barrier properties which plastics resin films cannot provide, while the films provide surface corrosion resistance for the surfaces of the foil.

Typically, foil-film laminates are produced by adhesive bonding, normally under conditions of heat and pressure.

While the desired properties for both the foil and film layers requires only relatively thin material layers, it is extremely difficult to work with such thin layers under commercial production limitations of equipment and speed.

U.S. Pat. No. 3,589,975 discloses a method in which an unmounted plastics resin film layer and aluminum foil layer are passed between a pair of work rolls in a rolling mill. At the work rolls, both the film and the foil are reduced significantly in thickness, thus increasing the yield of sheet material for a given weight of material input, and with bonding of the plastics resin film to the aluminum foil occurring at the work rolls.

Subsequently, it has been found that the adhesion of the film and foil in the process described in U.S. Pat. No. 3,589,975 is insufficient for many commercial uses. There remains, however, a need for plastics resin film-metallic foil laminates of reduced thickness and with acceptable adherence.

THE PRESENT INVENTION

According to the present invention, the desired goal has now been obtained. The present invention comprises subjecting an adhesively bonded metallic foil-plastics resin film laminate to pressure between a pair of work rolls. Both the foil and the film layers are reduced substantially in their respective thicknesses, and are lengthened in the machine direction. The resulting laminate retains the properties of the individual component layers, has increased yield, and, surprisingly, maintains its adhesive bond. By employing the method of the present invention, therefore, metallic foil-plastics resin film laminates are produced in which the individual components layers are far thinner than could be, if the laminate were to be formed of individual layers having their final thicknesses.

BRIEF DESCRIPTION OF THE DRAWINGS

The method of the present invention will be more fully described with reference to the drawing in which.

DETAILED DESCRIPTION OF THE PREFERRED EMBODIMENTS

Figure 1:
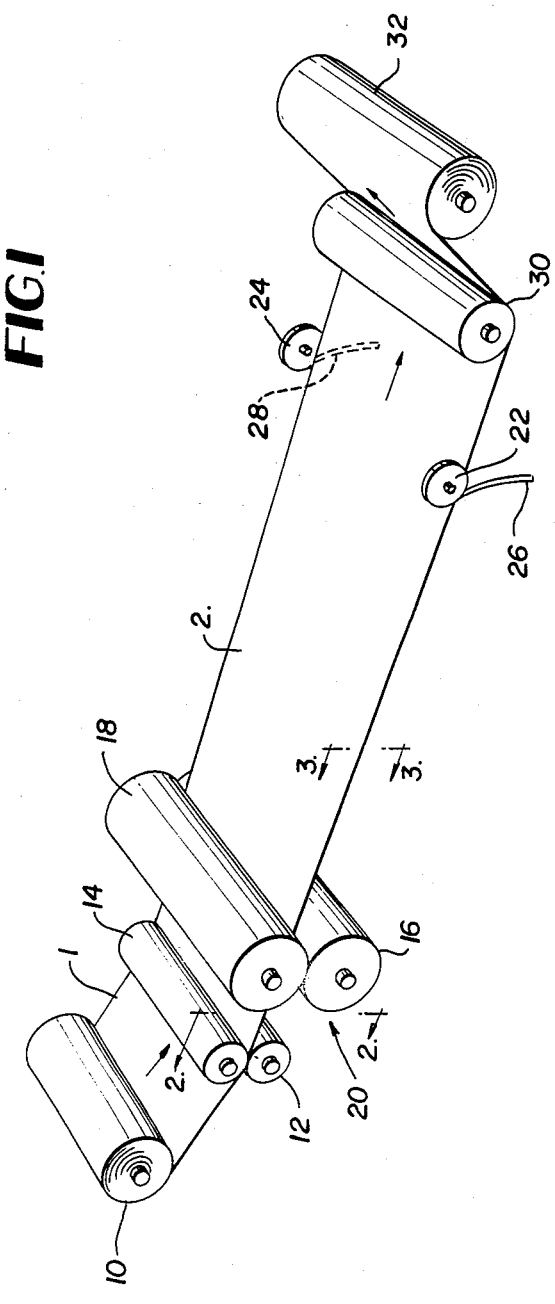
FIG. 1 is a schematic view of the apparatus employed in performing the method of the present invention.

Turning now to the FIGURES, in FIG. 1 a roll 10 of sheet material 1 is passed between a pair of guide rolls 12 and 14 and then enters the nip between a pair of work rolls 16 and 18 of a rolling mill, as is typical in the rolling art and which is not otherwise illustrated. The rolls 16 and 18 are unheated, and are preferably cooled, as is typical in the art, so that cold rolling of the laminate is accomplished, at a temperature up to about 150° F. (65.5° C.).

Figure 2:
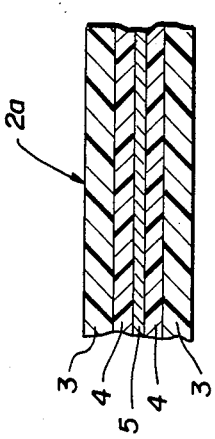
FIG. 2 is a cross-sectional view of one embodiment of an input laminate to the system.

In FIG. 2, a first embodiment of the input laminate 1 is illustrated. The laminate 1 comprises a layer 5 of a metallic foil, such as aluminum, steel, copper, lead, and the like, and may range in thickness from about 0.00025 to about 0.40 inches (about 0.000635 to about 1.016 centimeters).

Laminated to the foil layer 5 is a plastics resin film layer 3. The plastics resin film layer 3 may be formed from such materials as polypropylene, polyethylene, nylon, polyvinyl chloride and the like, with preference being made to polypropylene and high density polyethylene. The plastics resin film layer should be unoriented, as laminated to the metallic foil layer 5.

An adhesive 4 bonds the plastics resin film layer 3 and the metallic foil layer 5. Typical of the adhesives which may be employed are polyurethanes, ethylene vinyl alcohols, and the like, as well as pressure sensitive adhesives, which are not typically employed in bonding plastics resin films and metallic foils.

In order that successful co-rolling of the metallic foil and the plastics resin film occur without damage to the foil, film or the adhesive bond therebetween, it is important that the plastics resin film be chosen with properties permitting a degree of rolling roughly equivalent to that of the metallic foil. For example, if aluminum foil is employed as the metallic foil layer 5, the plastics resin film layer 3 should be chosen to have a tensile strength between about 4000 and about 6500 psi, preferably between about 4500 and about 5000 psi, and a percent elongation of between about 300 and about 1000, preferably between about 400 and about 700. If the percent elongation of film layer 3 is too low, the film layer 3 does not thin significantly during rolling. On the other hand, if the percent elongation of film layer 3 is too high, the rolling operation pulls the foil layer 5 apart in the machine direction. As previously stated, the plastics resin film should be unoriented, i.e., should not have been previously stretched or rolled in either the machine or the cross direction.

The plastics resin layer 3 may be provided as thin as available, and may have a thickness up to about 0.05 inches (0.127 centimeters).

Figure 3:
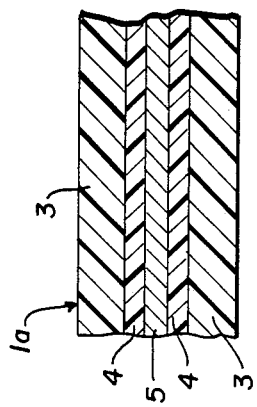
FIG. 3 is a cross-sectional view of the laminate of FIG. 2 after having been treated according to the method of the present invention.

Between work rolls 16 and 18, a compressive force is applied to the laminate 1, thinning laminate 1 and increasing the length thereof, resulting in a laminate 2, as illustrated in FIG. 3. The percent reduction in thickness for the plastics resin film layer 3 and the metallic foil layer 5 is approximately the same, and may be as high as about 70% per pass.

The rolling of laminate 1 into laminate 2 orients the plastics resin film layer 3 in the machine direction, i.e., the direction of rolling.

As illustrated, the laminate 1 is rolled down to laminate 2 in a single rolling mill pass. It is permissible, however, to have multiple rolling stations, or to employ multiple passes through a single mill station. Multiple pass rolling does, however, produce a laminate that is somewhat weakened in the cross, i.e., perpendicular to the machine, direction.

After passing between work rolls 16 and 18, the reduced laminate 2 has its jagged edges from rolling 26 and 28 cut by means of cutter knives 22 and 24, with the laminate 2 then passing beneath guide roll 30 and onto roll 32.

As illustrated in FIG. 1, a single pre-laminated roll 10 of film and foil is employed. This is not, necessarily, required. Alternatively, rolls of unmounted foil and film could be adhesively bonded by means of an adhesive extruder joining rolls of foil and film at the nip of rolls 12 and 14. This is a normal laminating technique for film and foil, and thus is not separately illustrated.

Figure 4:
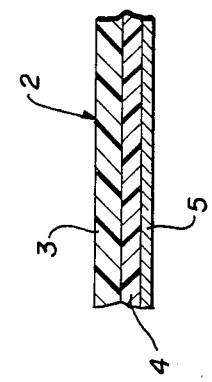
FIG. 4 is a cross-sectional view of a second embodiment of an input material to the system.
Figure 5:
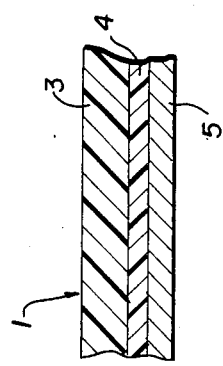
FIG. 5 is a cross-sectional view of the laminate of FIG. 4 after having been treated according to the method of the present invention.

FIGS. 4 and 5 illustrate a modified laminate which may be employed in the present invention. In this case, a pair of film layers 3 and adhesive layers 4 surround metallic foil layer 5, with the materials being any of the above-identified materials for the respective layers. As seen in FIG. 5, both plastics resin film layers 3 are reduced in approximately the same amount, and in proportion to the reduction of the metallic foil layer 5.

The laminate resulting from the present method maintains the barrier properties of the metallic foil layer and the physical properties of the plastics resin film layer, but, due to the increased yield from the co-rolling operation, produces a less costly end product.

It can thus be seen that the present invention provides a method for forming metallic foil-plastics resin film laminates having layer thicknesses far less than can be produced by mere lamination of the foil and film.

While the present invention has been described with reference to certain specific embodiments thereof, it is not intended to be so limited, except as set forth in the accompanying claims.

We claim:

1. In a method of forming a laminate of a plastics resin film and a metallic foil comprising cold rolling said plastics resin film and said metallic foil under pressure sufficiently high to thin both said plastics resin film and said metallic foil the improvement comprising selecting said plastics resin film to have a tensile strength and a percent elongation to provide a degree of rolling equivalent to that of said metallic foil, interposing an adhesive layer between said plastics resin film and said metallic foil thereby forming an adhesive bond between said plastics resin film and said metallic foil to form a unitary structure prior to said cold rolling and cold rolling said unitary structure without breaking said adhesive bond and without relative movement between said plastics resin film and said metallic foil to thereby achieve approximately equal thinning of said plastics resin film and said metallic foil and to thereby maintain structural integrity of said unitary structure after said cold rolling.

2. The method of claim 1 wherein said plastics resin film comprises polypropylene, polyethylene, nylon or polyvinyl chloride.

3. The method of claim 2 wherein said plastics resin film is unoriented polypropylene.

4. The method of claim 2 wherein said plastics resin film is unoriented polyethylene.

5. The method of claim 1 wherein said plastics resin film has a tensile strength of between about 4000 and about 6500 psi.

6. The method of claim 5 wherein said plastics resin film has a tensile strength of between about 4500 and 5000 psi.

7. The method of claim 1 wherein said plastics resin film has a percent elongation of between about 300 and about 1000.

8. The method of claim 7 wherein said plastics resin film has a percent elongation of between abbout 400 and about 700.

9. The method of claim 1 wherein said plastics resin film has a thickness of up to about 0.05 inches (0.127 centimeters) prior to said rolling.

10. The method of claim 1 wherein said metallic foil comprises aluminum, steel, copper or lead.

11. The method of claim 10 wherein said metallic foil comprises aluminum.

12. The method of claim 1 wherein said metallic foil has a thickness of between about 0.00025 inches and about 0.4 inches (0.000635 and 0.016 centimeters) prior to said rolling 13. The method of claim 1 wherein a polyurethane, ethylene vinyl alcohol or a pressure sensitive adhesive is employed in said adhesively bonding.

14. The method of claim 1 wherein said plastics resin film and said metallic foil are each reduced in thickness by up to about 70 percent per rolling pass.

15. The method of claim 14 wherein a single rolling pass is employed.

16. The method of claim 14 wherein multiple rolling passes are employed.

17. The method of claim 1 wherein said adhesively bonding comprises extruding an adhesive between said plastics resin film and said metallic foil and adhering said laminate under pressure in line with and prior to said rolling.

* * * * *